United States Patent [19]
Wilson

[11] Patent Number: 5,599,053
[45] Date of Patent: Feb. 4, 1997

[54] CANTILEVERED SPORT AND UTILITY RACK BRACKET

[76] Inventor: John T. Wilson, 138 Summer St., N. Easton, Mass. 02356

[21] Appl. No.: 332,388

[22] Filed: Oct. 31, 1994

[51] Int. Cl.$^6$ .............................. B65D 43/08; B60P 3/00
[52] U.S. Cl. .............................. 296/3; 224/403; 224/405
[58] Field of Search ...................... 296/3, 37.6, 10; 224/402, 403, 404, 405, 539

[56] References Cited

U.S. PATENT DOCUMENTS

| | | | |
|---|---|---|---|
| 4,469,257 | 9/1984 | Parker | 225/403 |
| 4,527,827 | 7/1985 | Maniscalco et al. | 296/3 |
| 5,255,832 | 10/1993 | Christensen | 296/37.6 X |
| 5,255,951 | 10/1993 | Moore, III | 224/405 X |
| 5,303,585 | 4/1994 | Price | 224/405 |
| 5,310,238 | 5/1994 | Wheatley | 296/3 X |
| 5,393,114 | 2/1995 | Christensen | 296/3 X |

*Primary Examiner*—Joseph D. Pape
*Attorney, Agent, or Firm*—John P. McGonagle

[57] ABSTRACT

An improved sport and utility rack bracket particularly for use with pickup trucks. The bracket is a cantilevered assembly mounted on a side rail defining a portion of the cargo area of a pickup truck. The bracket has a rack attached thereto. The free end of the bracket, i.e., the cantilevered portion of the bracket, is parallel to or at some angle to the horizontal plane of the truck bed, transverse to the longitudinal axis of the vehicle.

13 Claims, 4 Drawing Sheets

5,599,053

CANTILEVERED SPORT AND UTILITY RACK BRACKET

BACKGROUND OF THE INVENTION

This invention relates to sport and utility racks, and in particular to a cantilevered sport and utility rack bracket for use in conjunction with a pickup truck.

Prior art rack systems for automobiles and pickup trucks follow two basic principles of construction. Racks constructed according to the first principle are mounted on the roof of the vehicle. Racks constructed according to the second principle are mounted/secured at both ends of the rack. A variation of the second principle includes those rack systems designed for trucks that connect to the top of a truck bed at all four corners and sometimes extend over the cab.

In the case of pickup trucks, prior art sport and utility rack systems are especially limited. A pickup truck cab roof does not have a sufficiently long axis parallel to the longitudinal axis of the truck in which to attach a roof sport and utility rack system, such as a ski rack. The alternative option is to attach it to support members in the interior cargo area, i.e., generally positioned on the cargo bed. This limits the amount of "cargo" which can be carried in the truck along with the skis.

SUMMARY OF THE INVENTION

In view of the foregoing disadvantages inherent in the known types of devices now present in the prior art, the present invention provides an improved sport and utility rack bracket particularly for use with pickup trucks. As such, the general purpose of the present invention, which will be described subsequently in greater detail, is to provide a new and improved sport and utility rack bracket which may be mounted in a pickup truck cargo area without interfering with cargo carried therein.

To attain this, the present invention discloses a cantilevered bracket assembly mounted on a side rail defining a portion of the cargo area of a pickup truck. The free end of the rack, i.e., the cantilevered portion of the rack, is parallel to or at some angle to the horizontal plane of the truck bed, transverse to the longitudinal axis of the vehicle.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
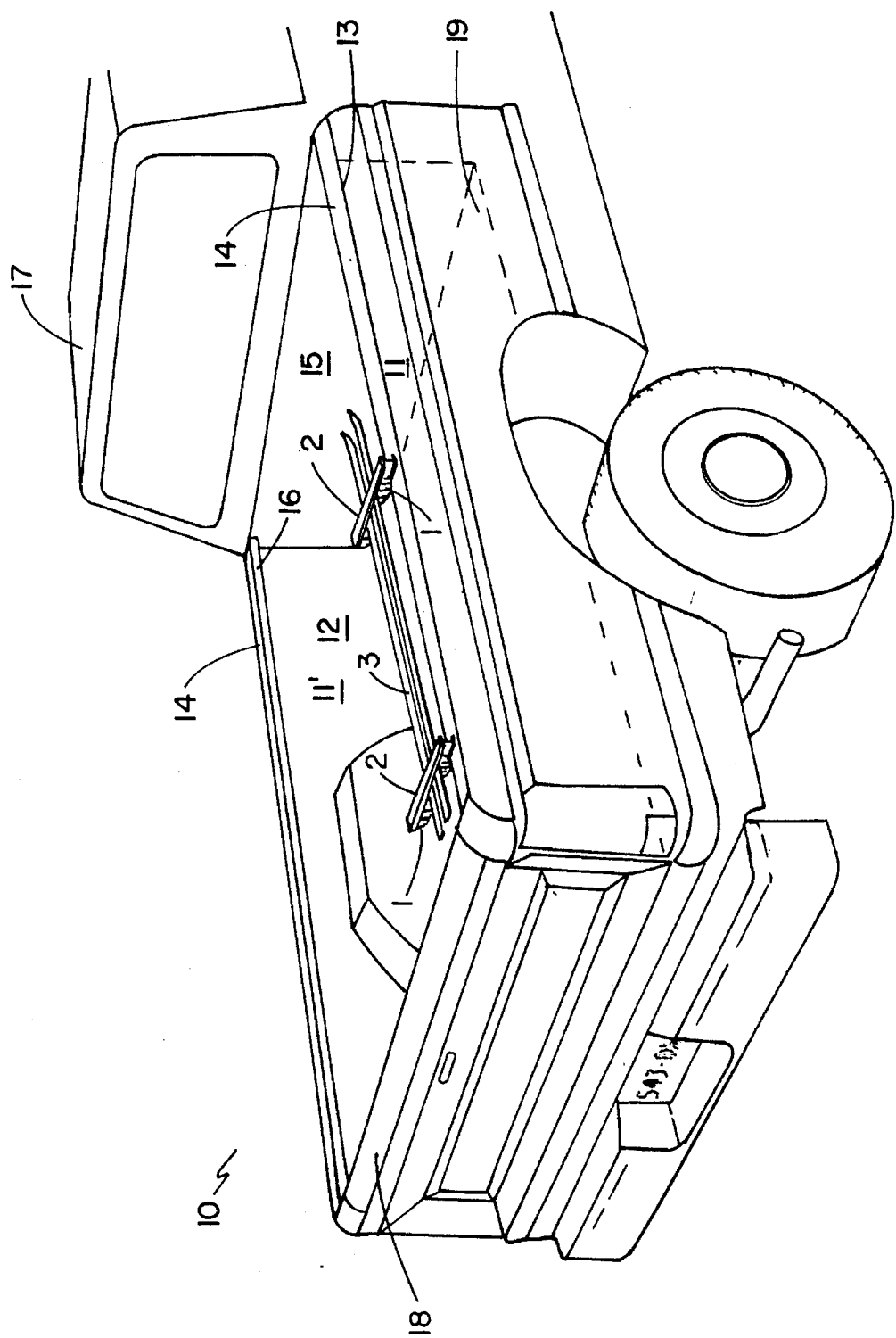
FIG. 1 is a perspective view of the sport and utility rack bracket of the present invention installed on a pickup truck.

Referring to the drawings in detail wherein like elements are indicated by like numerals, there is shown an embodiment of the invention 1 incorporating a cantilevered sport and utility rack bracket. FIG. 1 illustrates the invention 1 as part of a sport and utility rack system mounted on a pickup truck 10. The truck 10 has an open rear cargo area 12 defined forwardly by a truck cab 17, rearwardly by a tail gate 18, along the sides by vertical, opposite side walls 11, and on the bottom by a cargo bed 19. The top 13 of each vertical side wall 11 terminates in a horizontal rail 14 running the length of the side wall 11. The rail 14 is directed horizontally toward the cargo area interior 15. The rail 14 generally terminates in a downwardly extending stiffener flange 16 running the length of the rail 14. The stiffener flange 16 lies in a plane interior to and generally parallel to the plane of the side wall 11.

The invention 1 is used in pairs and are mounted in parallel on one of the vertical side walls 11 in the truck cargo area 12, perpendicular to the longitudinal axis of the truck 10 which runs from the tail gate 18 through the cab 17. The invention has an upper flange 20, a vertical connecting flange 30, a lower flange 60, and a center web element 80. The upper flange 20 is positioned horizontally and perpendicularly with reference to a side wall 11 and is connected to the vertical connecting flange 30 which is positioned generally vertically with reference to a side wall 11. The lower flange 60 is positioned horizontally and perpendicularly with reference to a side wall 11 and is connected to the vertical connecting flange 30 at a positioned below the upper flange 20. The center web element 80 provides a stiffening element interconnecting the upper, lower and vertical connecting flanges 20, 60, 30. For purposes of exposition the invention 1 directions are defined as "forward" and/or "inner surfaces" being toward an opposite side wall 11'; "rear" and/or "outer surfaces" being toward the side wall 11 to which the invention 1 is attached; "bottom" being toward the cargo area bed 19; "top" being away from the cargo area bed 19; "vertical" being "top" to "bottom"; and "horizontal" being in a plane parallel to the rail 14 and cargo bed 19 planes.

The upper flange 20 is a flat, generally elongated, member having two ends, one defined as the free, forward end 21 and the other as the rear, connecting end 22. The axis from the forward end 21 to the rear end 22 is defined as the upper flange longitudinal axis. The upper flange 20 has a top surface 23, a bottom surface 24, and two sides 25. The sport and utility rack 2, itself, is attached to the upper flange top surface 23.

The vertical connecting flange 30 is a flat, generally elongated, member having a top end 31, a bottom end 32, an inner surface 33, an outer surface 34, and two sides 35. The vertical connecting flange longitudinal axis is defined as the axis between the top end 31 and the bottom end 32. The side-to-side widths of the upper flange 20 and vertical connecting flange 30 are the same. The vertical connecting flange top end 31 is joined to the upper flange bottom surface 24 at a junction line 26 at a distance of approximately one-fifth of the longitudinal upper flange length from the connected end 22. The junction line 26 is transverse to the longitudinal axis of the upper flange 20. The portion of the upper flange 20 extending from the junction 26 to the connected end 22 is defined as the upper flange support portion 27. The plane of the vertical connecting flange 30 is perpendicular to the plane of the upper flange 20.

The vertical connecting flange 30 includes a flat, generally elongated horizontal connecting flange 40 perpendicularly attached to the vertical connecting flange outer surface 34 along a junction line 36 approximately one-fifth of the longitudinal vertical connecting flange length from the top end 31. The junction line 36 is transverse to the longitudinal axis of the vertical connecting flange 30. The horizontal connecting flange 40 has a joined end 41, a rear end 42, a top surface 43, a bottom surface 44, and two sides 45. The axis from the joined end 41 to the rear end 42 is defined as the horizontal connecting flange longitudinal axis. The side-to-side widths of the vertical connecting flange 30 and horizontal connecting flange 40 are the same. The plane of the horizontal connecting flange 40 is parallel to the plane of the upper flange support portion 27, and both 40, 27 are also approximately the same length.

A narrow, elongated, vertical, rear web element 50 interconnects the longitudinal central portion 48 of the horizontal connecting flange top surface 43 with the longitudinal central portion 28 of the upper flange bottom surface 24 in the support portion 27. A vertical cross-sectional view of the rear web element 50, the upper flange support portion 27, and the horizontal connecting flange 40 in a plane perpendicular to the longitudinal axis of the upper flange 20, would give the combination of elements 50, 27, 40 the appearance of an I-beam. The rear web element 50 has a forward end 51 and a rear end 52. The forward end 51 terminates at and joins the longitudinal central portion 37 of the vertical connecting flange outer surface 34.

The lower flange 60 is comprised of a shaped, flat, generally elongated, flange member 61. The lower flange member 61 has a top surface 65, a bottom surface 66, and two sides 67. The lower flange member 61 is divided into a forward section 62 and a rear section 63. The axis along the forward section 62 is generally coincident with the lower flange longitudinal axis.

The lower flange element forward section forward end 68 is joined to a center web element forward end 82. The lower flange element forward section 62 tapers laterally outward from its forward end 68 to the lower flange element rear section 63. The lower flange element forward section 62 lies in a plane which gradually diverges downward in a rearward direction from the plane of the upper flange 20. The forward section 62 terminates in the rear section 63. The rear section 63 has lateral sides 64 parallel to each other and lies in a plane which sharply diverges downward in a rearward direction from the plane of the upper flange 20. The rear section 63 extends below and past the vertical connecting flange 30. The vertical connecting flange bottom end 32 is attached to the lower flange element rear section top surface 65. The lower flange element rear section bottom surface 66 may optionally have a rounded stiffener element 73 formed thereon for added structural strength.

A narrow, elongated, vertical, center web element 80 interconnects the longitudinal central portion 71 of the lower flange top surface 65 with the longitudinal central portion 28 of the upper flange bottom surface 24 along the upper flange portion 29 forward of the support portion 27. The center web element 80 has a forward end 82, a rear end 83, a top 84, bottom 85, and two sides 86. The center web element forward end 82 joins the longitudinal central portion 72 of the lower flange forward section top surface 65. The center web element rearward end 83 terminates at and joins the longitudinal central portion 38 of the vertical connecting flange inner surface 33. The center web element top 88 terminates at and joins the longitudinal central portion 28 of the upper flange bottom surface 24. The center web element bottom 85 terminates at and joins the longitudinal central portion 72 of the lower flange forward section top surface and rear section top surface 65 forward of the vertical connecting flange 30. The center web element 80 has four horizontal openings 81 formed through the sides 86. The openings 81 are positioned to lessen weight as well as wind resistance and torque along the longitudinal axis of the truck 10.

The vertical connecting flange 30 also includes a holding assembly 90. The holding assembly 90 is comprised of a shaped block 100 with holding fasteners 91. The block 100 has a top portion 101, bottom portion 102, rear surface 103, front surface 104, and two sides 105. The block sides 105 are flat and lie in vertical planes parallel to each other and perpendicular to the truck side walls 11. The rear surface 103 has an upper portion 106 and a lower portion 107. The rear surface upper portion 106 is flat and lies in a plane approximately parallel to the planes of the side walls 11. The rear surface lower portion 107 slopes downward and inward, away from the side wall 11 to which the invention 1 is attached, at an approximate 45° from vertical, terminating at the block rounded bottom portion 102. The front surface 104 has an upper portion 108 and a lower portion 109. The front surface upper portion 108 has a mildly concave, horizontal channel 110 formed across it from side 105 to side 105, said channel 110 resulting in a horizontal lower channel lip protrusion 112 and a horizontal upper channel lip protrusion 113. The front surface lower portion 109 slopes downward and outward, toward the side wall 11 to which the invention 1 is attached, at an approximate 30° from vertical, terminating at the block's rounded bottom portion 102. The block 100 has two parallel, side by side, cone-shaped holes 111 formed therein. The holes 111 begin at the rear surface lower portion 107 and extend and expand upwardly and forwardly through the block 100, perpendicular to the plane of the rear surface lower portion 107, exiting out the front surface upper portion 108 along the lower lip 112 of the horizontal channel 110. The cone shape of the holes 111 allows the block 100 to find its own seat. The top portion 101 also has a horizontal shallow channel 114 formed across it from side 105 to side 105, said channel 114 resulting in a horizontal forward channel lip protrusion 115 and a horizontal rearward channel lip protrusion 116.

The vertical connecting flange 30 has two parallel, side by side, holes 39 formed therein, below the junction line 36. Each hole 39 is to one side of the longitudinal central portion 38 of the vertical connecting flange inner surface 33. The vertical connecting flange 30 also has two, parallel, wedge-shaped blocks 92 formed on its inner surface 33, on each side of the central portion 38 over the holes 39. Each wedge-shaped block 92 has a hole 93 formed therein. Each wedge-shaped block hole 93 extends from the vertical connecting flange hole 39, over which the block 92 is positioned, inward and upward, at a 45° from vertical, through to an inward and upward facing block surface 94. Each fastener 91 is inserted into each side of the vertical flange hole 93 of the vertical flange wedge-shaped hole 93 from the inward and upward facing block surface 94, through the respective vertical connecting flange hole 39, into and through the respective block hole 111, and exiting from the block rear surface lower portion 107. In this embodiment of the invention, the fasteners used are threaded carriage bolts 95, each having a head cap 96, washer 97, and fastening nut 98. The head cap 96 is positioned at the inward and upward facing block surface 94. The washer 97 and nut 98 are attached to the bolt 95 at the block rear surface lower portion 109.

An L-shaped section of elastomeric material 99 is attached to the shaped block top portion 101 and another section of elastomeric material 99' to the horizontal connecting flange bottom surface 44. The invention 1 is attached to the truck 10 by positioning the invention 1 so that the stiffener flange 16 abuts the vertical connecting flange outer surface 34 below the junction line 36, and the rail 14 is sandwiched between the horizontal connecting flange bottom surface 44 with elastomeric material 99 and the shaped block top portion 101 with elastomeric material 99. The shaped block 100 is brought to bear against the rail 14 and stiffener flange 16 by tightening the nuts 98 which consequently pulls the block 100 upward and forward toward the vertical connecting flange outer surface 34. The block 100 compresses against the rail 14 along the top portion channel forward and rearward horizontal lips 115, 116. The block 100 compresses against the stiffener flange 16 along the front surface channel upper lip 113. The use of two, side-by-side fasteners 91 prevents invention movement due to lateral forces. Tightening of the fasteners 91 also brings the block bottom portion 102 into engagement with the lower flange rear section top surface 65 thereby creating compression forces on the lips 115, 116, 113.

Figure 2:
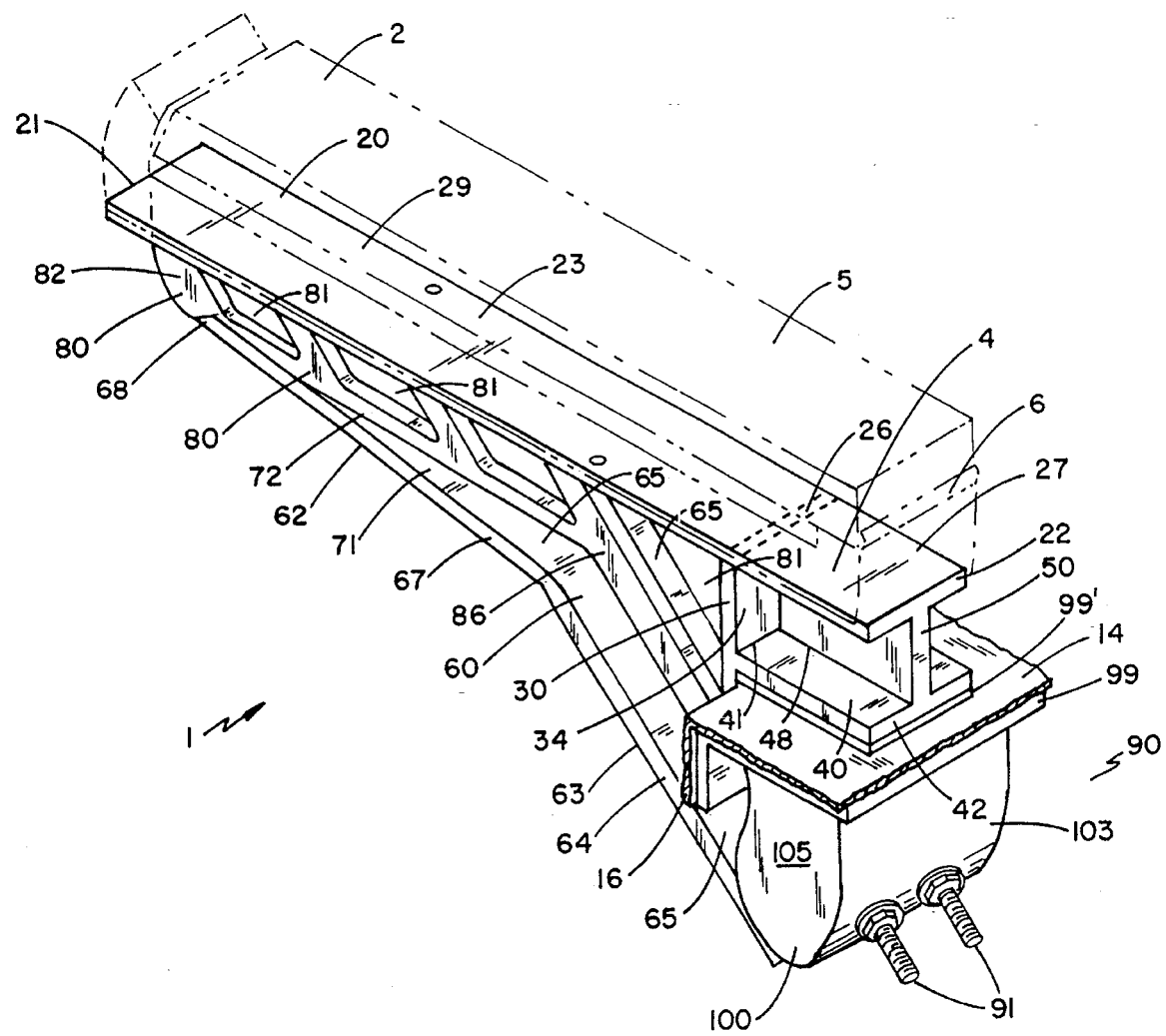
FIG. 2 is a close-up perspective view of the sport and utility rack bracket shown in FIG. 1.
Figure 3:
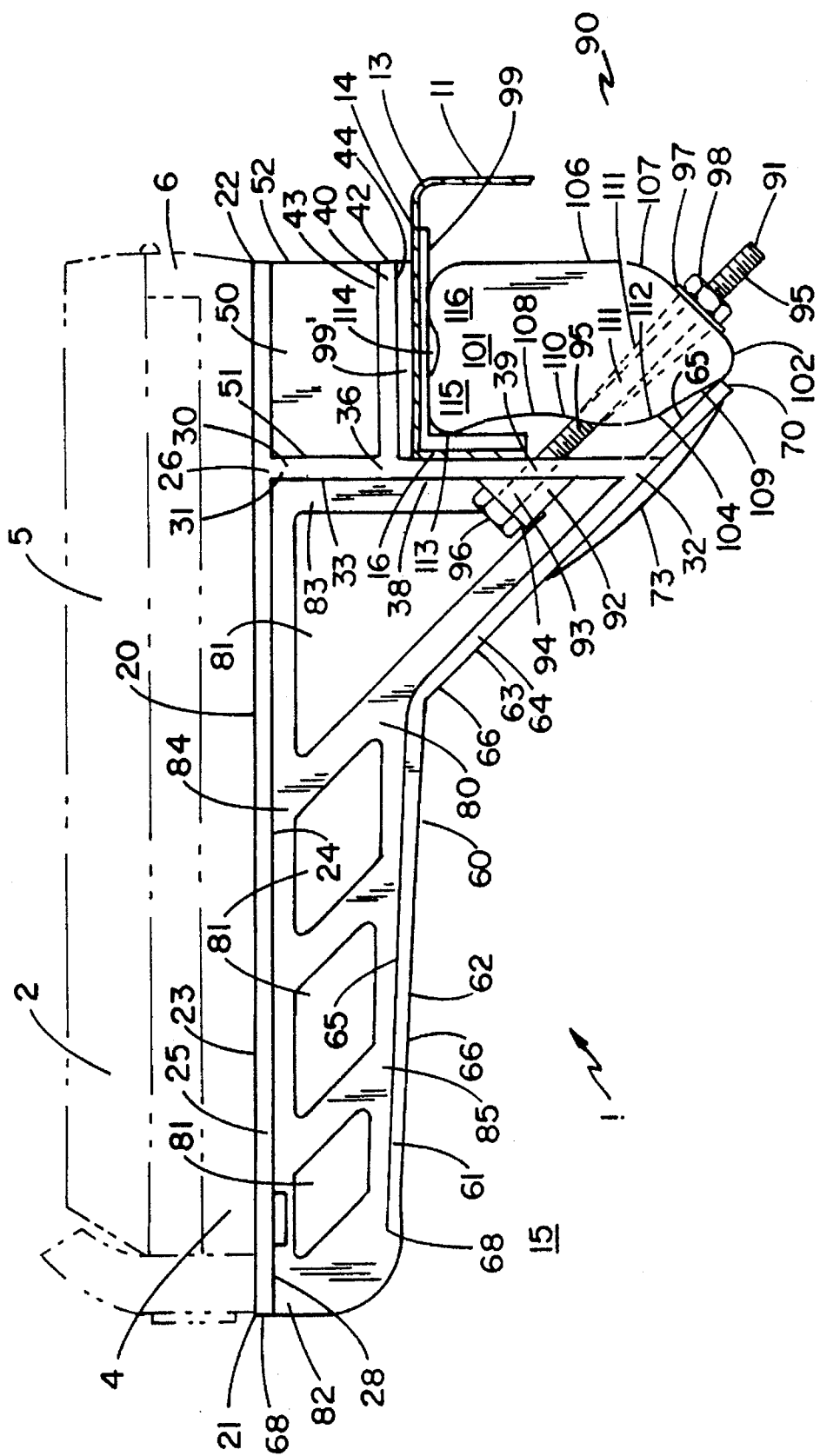
FIG. 3 is a side elevational view of the sport and utility rack bracket shown in FIG. 2.
Figure 4:
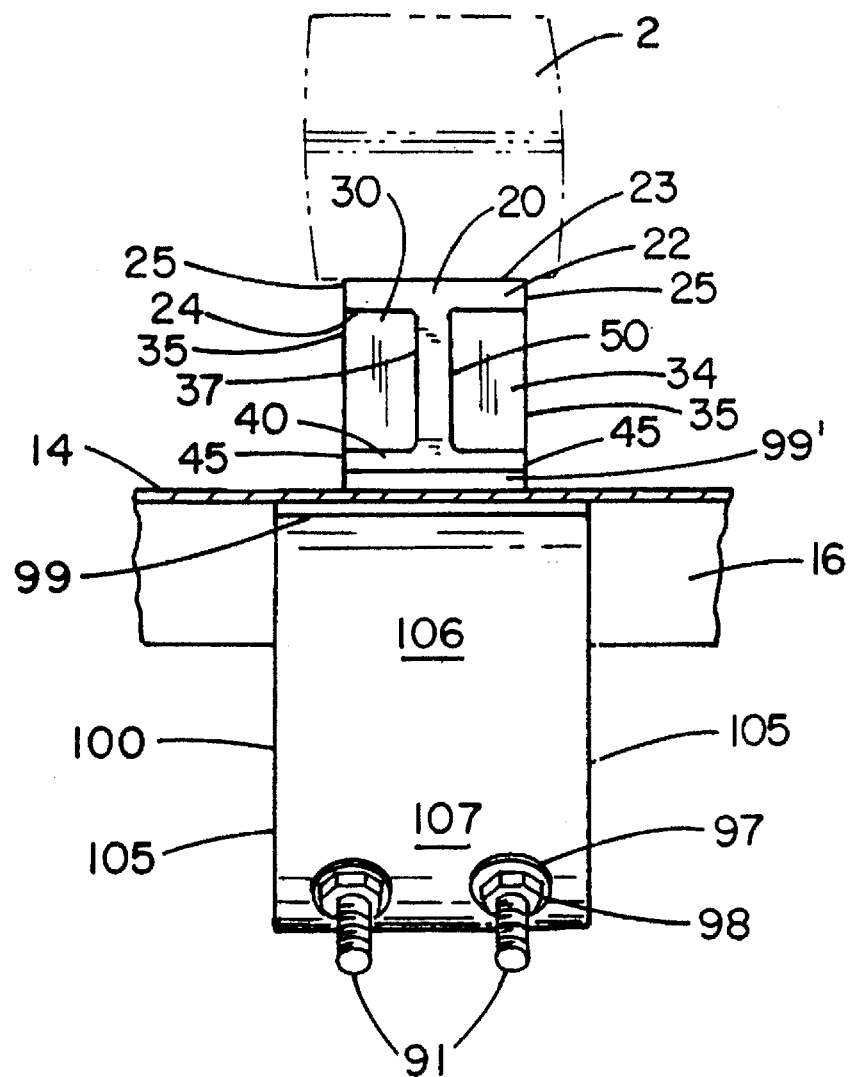
FIG. 4 is a rear elevational view of the sport and utility rack bracket shown in FIG. 2.

In this embodiment of the invention, the block 100 is made out of a hard wood, such as oak. This provides strength and holding power as well as a measurable amount of resiliency for increased holding ability. The block 100 would be coated with a marine varnish or the like to protect it from the elements. The remainder of the invention in this embodiment is made from steel. Other metals, including aluminum could be used. Sturdy plastic materials could also be used. The inventor has found that the invention described above is useful not only for attaching conventional ski racks to the upper flange top surface 23, but also for attaching racks 2 for elongated articles of any nature, such as pipes, boards, fishing rods, bicycles, and the like. See FIG. 1. A rack 2 may be attached to the upper flange top surface 23 by any conventional means, such as glue, fasteners, or the like. See FIGS. 2–4. The utility rack 2 shown in this embodiment of the invention 1 holds an article 3 between two bars, one 4 bar being horizontally attached to the upper flange top surface 23 and the other bar 5 pivotally attached at one end 6 to the first bar 4 and adapted to being locked in a horizontal position parallel to said first bar 4. The main advantage being that the cantilevered arrangement of the rack bracket of the present invention provides a secure rack for the articles being held, and availability of the cargo bed without interference from the rack.

It is understood that the above-described embodiment is merely illustrative of the application. Other embodiments may be readily devised by those skilled in the art which will embody the principles of the invention and fall within the spirit and scope thereof.

I claim:

1. A cantilevered sport and utility rack bracket for mounting on a pickup truck, said truck having a rear cargo area, the interior of which being defined forwardly by a truck cab, rearwardly by a tail gate, along the sides by vertical, opposite side walls, and on the bottom by a cargo bed, the top of each vertical side wall terminating in a horizontal rail running the length of the side wall, said rail being directed horizontally toward the cargo area interior, said rail terminating in a downwardly extending stiffener flange running the length of the rail, said stiffener flange lying in a plane interior to and generally parallel to the plane of the side wall, comprising:

an upper flange positioned horizontally and perpendicularly with reference to a side wall, said upper flange being a flat, generally elongated, member having a top surface, a bottom surface, two sides and two ends, one defined as the free, forward end and the other as the rear, connecting end, wherein an axis from the free, forward end to the rear, connecting end is defined as the upper flange longitudinal axis, wherein a sport and utility rack is attached to the upper flange top surface;

a vertical connecting flange positioned generally vertically with reference to said side wall and connected thereto, said vertical connecting flange being a flat, generally elongated, member having a top end, a bottom end, an inner surface, an outer surface, and two sides, said top end being joined to the upper flange bottom surface at a junction line at a distance of approximately one-fifth of the longitudinal upper flange length from the rear, connecting end, said junction line being transverse to the longitudinal axis of the upper flange, the portion of the upper flange extending from the junction line to the rear, connecting end being defined as the upper flange support portion, the plane of the vertical connecting flange being perpendicular to the plane of the upper flange, wherein an axis between the vertical connecting flange top end and bottom end is defined as the vertical connecting flange longitudinal axis, wherein the side-to-side widths of the upper flange and vertical connecting flange are the same;

a lower flange, connected to said vertical connecting flange at a positioned below said upper flange, said lower flange being a shaped, flat, generally elongated member having a top surface, a bottom surface, and two sides, said member being divided into a forward section with a forward end, and a rear section, wherein an axis along the forward section defines the lower flange longitudinal axis; and a holding assembly comprised of a shaped block with holding fasteners connected to the vertical connecting flange and adapted to engage said truck horizontal rail and stiffener flange.

2. A cantilevered sport and utility rack bracket as recited in claim 1, further comprising:

a flat, generally elongated horizontal connecting flange perpendicularly attached to the vertical connecting flange outer surface along a junction line approximately one-fifth of the longitudinal vertical connecting flange length from the top end, said junction line being transverse to the longitudinal axis of the vertical connecting flange, said horizontal connecting flange having a joined end, a rear end, a top surface, a bottom surface, and two sides, wherein an axis from the joined end to the rear end is defined as the horizontal connecting flange longitudinal axis, wherein the side-to-side widths of the vertical connecting flange and horizontal connecting flange are the same, wherein the plane of the horizontal connecting flange is parallel to the plane of the upper flange support portion, and wherein said horizontal connecting flange and said upper flange support portion have approximately the same length.

3. A cantilevered sport and utility rack bracket as recited in claim 2, further comprising:

a narrow, elongated, vertical, rear web element having a forward end and a rear end, said rear web element interconnecting the horizontal connecting flange top surface with the longitudinal central portion of the upper flange bottom surface in the support portion.

4. A cantilevered sport and utility rack bracket as recited in claim 3, wherein:

said rear web element forward end terminates at and joins the vertical connecting flange outer surface.

5. A cantilevered sport and utility rack bracket as recited in claim 4, further comprising:

a narrow, elongated, vertical, center web element having a forward end, a rear end, a top, bottom, and two sides, said center web element rearward end terminating at and joining the vertical connecting flange inner surface, said center web element top terminating at and joining the upper flange bottom surface forward of the support portion, said center web element bottom terminating at and joining the lower flange forward section top surface and rear section top surface forward of the vertical connecting flange.

6. A cantilevered sport and utility rack bracket as recited in claim 5, wherein:

said lower flange forward section forward end is joined to said center web element forward end;

said lower flange forward section is tapered laterally outward from its forward end to the lower flange rear section;

said lower flange forward section lies in a plane which gradually diverges downward in a rearward direction from the plane of the upper flange and terminates in said lower flange rear section;

said lower flange rear section has lateral sides parallel to each other and lies in a plane which sharply diverges downward in a rearward direction from the plane of the upper flange;

said lower flange rear section extends below and past the vertical connecting flange; and said vertical connecting flange bottom end is attached to the lower flange rear section top surface.

7. A cantilevered sport and utility rack bracket as recited in claim 6, wherein:

the center web element has a plurality of horizontal openings formed through its sides.

8. A cantilevered sport and utility rack bracket as recited in claim 7, wherein:

the vertical connecting flange has two parallel, side by side, holes formed therein, below the junction line on each side of the center web element;

said shaped block has a top portion, bottom portion, rear surface, front surface, two sides, and two parallel, side by side, cone-shaped holes formed therein, said holes beginning at the rear surface and extending upwardly and forwardly through the block and exiting out the front surface;

a fastener is inserted into each vertical connecting flange hole and into and through a corresponding shaped block hole.

9. A cantilevered sport and utility rack bracket as recited in claim 8, wherein:

said shaped block sides are flat and lie in vertical planes parallel to each other and perpendicular to the truck side walls;

said shaped block rear surface has an upper portion and a lower portion, said rear surface upper portion being flat and lying in a plane approximately parallel to the planes of the side walls, said rear surface lower portion sloping downward and inward, away from the side wall to which the invention is attached, at an approximate 45° from vertical, terminating at the shaped block bottom portion;

said shaped block front surface has an upper portion and a lower portion, said front surface upper portion having a mildly concave, horizontal channel formed across it from side to side, said channel resulting in a horizontal lower channel lip protrusion and a horizontal upper channel lip protrusion being formed on said front surface upper portion, said front surface lower portion sloping downward and outward, toward the side wall to which the invention is attached, at an approximate 30° from vertical, terminating at the block's bottom portion;

said shaped block cone-shaped holes begin at the rear surface lower portion and extend and expand upwardly and forwardly through the block, perpendicular to the rear surface lower portion, exiting out the front surface upper portion along the lower lip of the horizontal channel; and said shaped block top portion has a horizontal shallow channel formed across it from side to side, said channel resulting in a horizontal forward channel lip protrusion and a horizontal rearward channel lip protrusion.

10. A cantilevered sport and utility rack bracket as recited in claim 9, further comprising:

two, parallel, wedge-shaped blocks formed on the vertical connecting flange inner surface, on each side of the center web element over the vertical connecting flange holes, each said wedge-shaped block having a hole formed therein extending from the vertical connecting flange hole, over which the block is positioned, inward and upward, at a 45° from vertical, through to an inward and upward facing block surface.

11. A cantilevered sport and utility rack bracket as recited in claim 10, wherein:

each said fastener is inserted into each side of the vertical connecting flange from the inward and upward facing block surface, through the corresponding vertical connecting flange hole, into and through a corresponding shaped block hole, through to the shaped block rear surface lower portion.

12. A cantilevered sport and utility rack bracket as recited in claim 11, wherein each fastener is comprised of:

a threaded carriage bolt having a head cap;

a washer and fastening nut attached to said bolt;

wherein the bolt is inserted into a wedge-shaped hole from the inward and upward facing block surface, through the corresponding vertical connecting flange hole, into and through a corresponding shaped block hole, through to the shaped block rear surface lower portion so that the head cap is positioned at the inward and upward facing block surface, and the washer and nut are attached to the bolt at the block rear surface lower portion.

13. A cantilevered sport and utility rack bracket as recited in claim 12, further comprising:

a section of elastomeric material attached to the shaped block top portion;

a section of elastomeric material attached to the horizontal connecting flange bottom surface.

* * * * *